United States Patent [19]

Marquis

[11] Patent Number: 5,106,156
[45] Date of Patent: Apr. 21, 1992

[54] DETACHABLE FOLDABLE TRAY FOR CHILD VEHICLE SAFETY SEATS

[76] Inventor: James R. Marquis, 9 Harris St., Springdale, Me. 04083

[21] Appl. No.: 560,347

[22] Filed: Jul. 30, 1990

[51] Int. Cl.[5] ............................................. A47B 83/02
[52] U.S. Cl. .................................... 297/153; 297/250; 297/148; 108/43
[58] Field of Search ............... 297/153, 149, 250, 148; 108/43, 44, 45

[56] References Cited

U.S. PATENT DOCUMENTS

| | | | |
|---|---|---|---|
| 696,044 | 3/1902 | Hoffman | 108/43 |
| 1,082,884 | 12/1913 | Leonard | 297/153 |
| 1,336,954 | 4/1920 | Gillies | 108/43 |
| 1,851,600 | 3/1932 | Stanley | 108/43 |
| 3,515,429 | 6/1970 | Bollinger | 297/153 |
| 3,788,699 | 1/1974 | Starr | 297/153 X |
| 3,791,314 | 2/1974 | Berretta | 108/43 |
| 4,936,628 | 6/1990 | Delaney | 297/153 |
| 4,958,577 | 9/1990 | Demaio et al. | 108/43 |

FOREIGN PATENT DOCUMENTS 1554344  10/1979  United Kingdom ............... 297/153

Primary Examiner—Peter A. Aschenbrenner
Attorney, Agent, or Firm—Laforest S. Saulsbury

[57] ABSTRACT

A detachable foldable tray adapted for use with a child's vehicle safety seat. Two tray parts are pivotally connected together and upon being extended are spread over the arm rests of the vehicle safety seat and Velcro means for securing the extended tray parts thereover. A releasable double latch bar is pivoted to one of the tray parts and when turned across the underfaces of the parts, will hold them against collapsing. The bar is bendable to release its Velcro connection with the tray parts and permit them to be folded. Bendable spring straps with Velcro means are bent down from underneath the tray parts for securement to frontal faces of the safety seat.

5 Claims, 2 Drawing Sheets

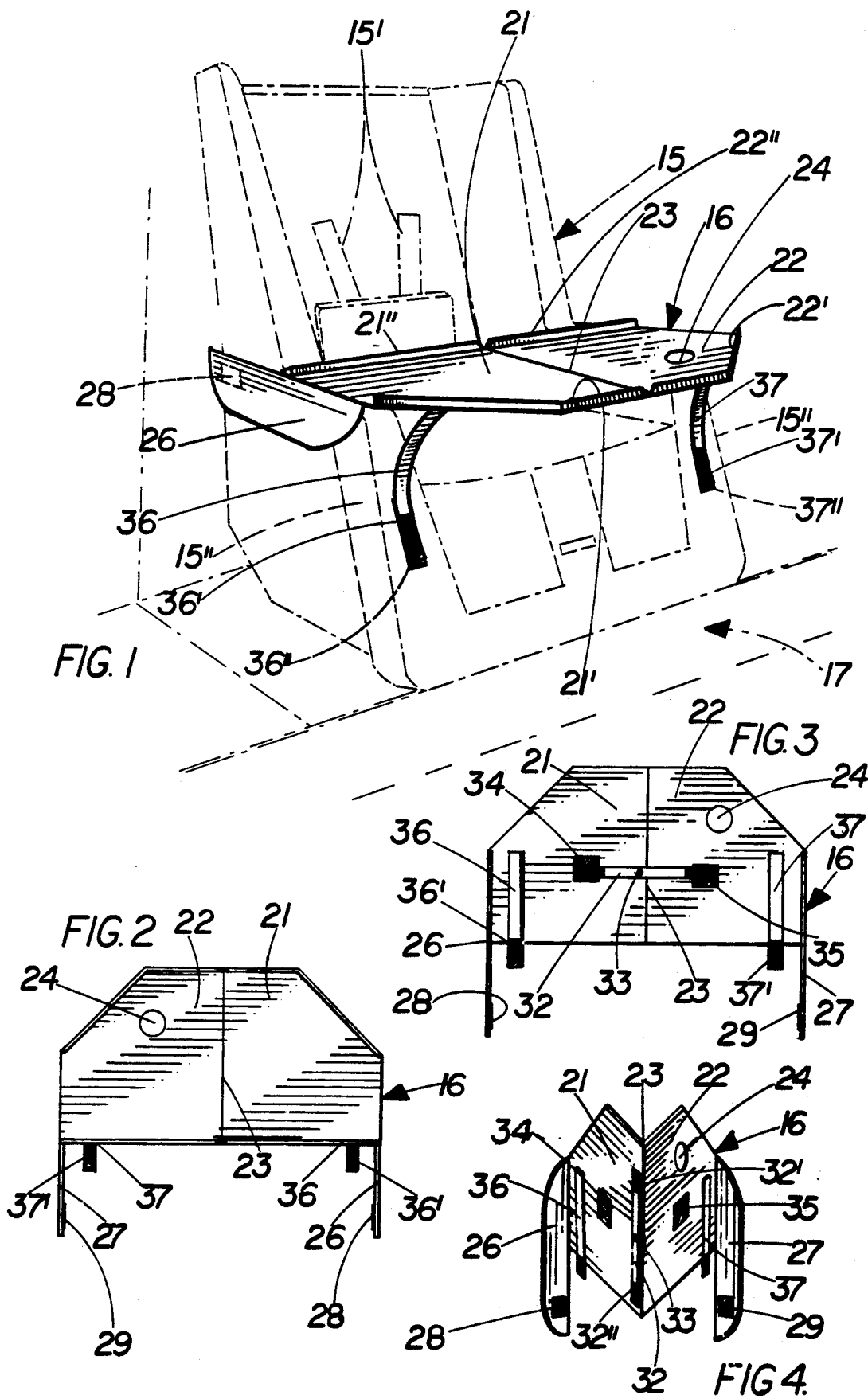

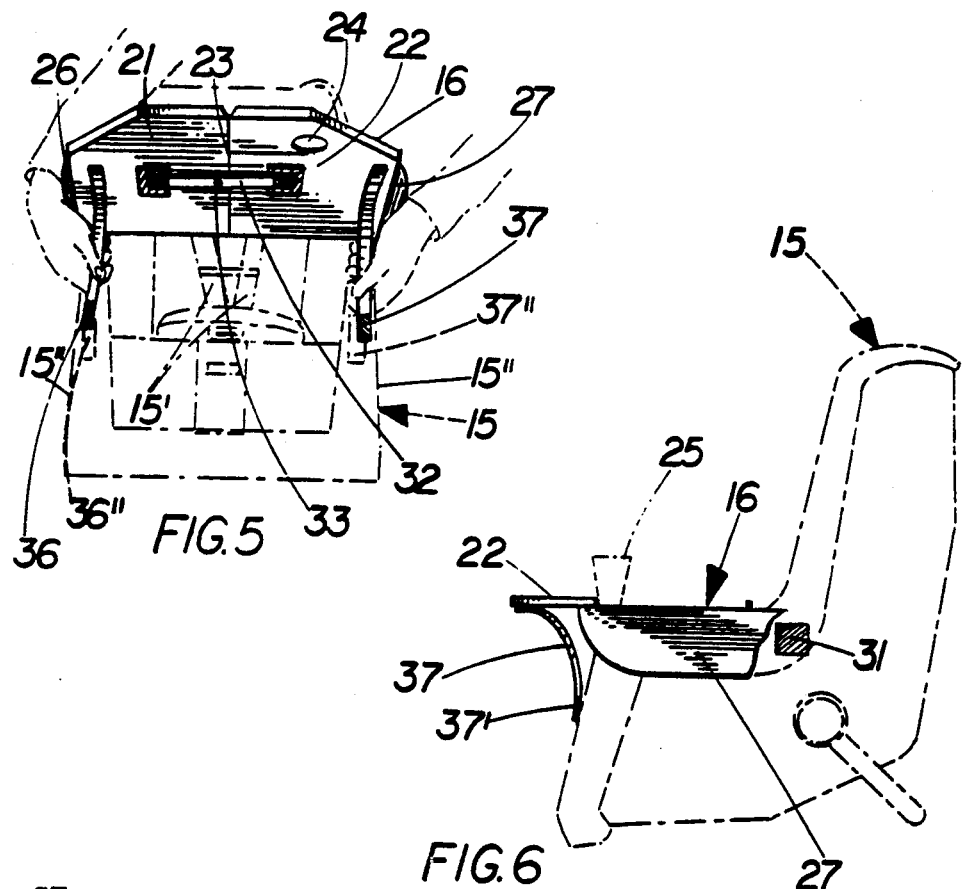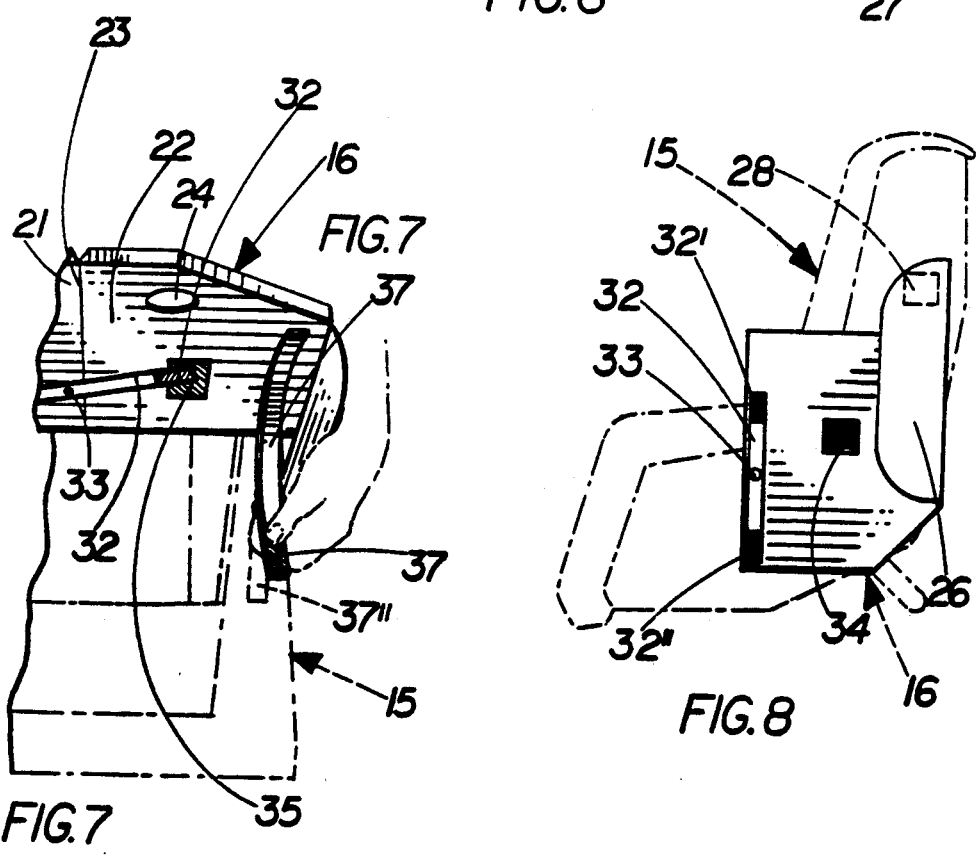

DETACHABLE FOLDABLE TRAY FOR CHILD VEHICLE SAFETY SEATS

This invention relates to a detachable and foldable tray for a child's vehicle safety seat.

Heretofore, trays of a child's vehicle safety seat have been made as a part of the vehicle seat assembly making for a costly construction, as seen in a U.S. Pat. No. 4,634,185 and not such that the tray is an attachment that can be made for different vehicle safety seats and removed for storage when not in use. A detachable, foldable tray is shown in U.S. Pat. No. 3,338,627 for use with wheelchairs but not adapted for use with vehicle child's safety seats. Vehicle child's safety seats will have the normal shoulder strap and frontal means for holding the child in the seat and arm rests of a padded nature are provided on the seat.

It is the principal object of the present invention to provide a detachable and foldable tray for use with padded child's vehicle safety seats that can be opened and spread over the arm rests and with easy attachable means for its securement to the seat.

It is another object of the invention to provide a detachable and foldable tray for use with child's vehicle safety seats that will be easy to handle on being attached to the seat and on removal therefrom.

It is still another object of the invention to provide a detachable and foldable tray for child's vehicle safety seats that can be folded for storage on being removed from the seat.

Other objects of the invention are to provide a detachable and foldable tray for child's vehicle safety seats, having the above objects in mind, which will be of simple construction, will have a minimum number of parts, inexpensive to manufacture, light in weight, attachable with novel Velcro means suitable to prevent removal by child from the seat when once in place thereon, effective and efficient in use.

GENERAL DESCRIPTION

According to this invention, a detachable and foldable tray is made of two parts that can be extended and locked together to be spread over the arm rests of the child's vehicle safety seats and with Velcro means at the rear of the seat upon fold down of rearwardly extending flaps having the Velcro attaching parts that will be removed from the child's reach and by downwardly extending spring-biased Velcro means that are drawn down for frontal attachment to the seat also out of the way for the child's reach. A double latch bar is pivoted upon the tray parts from underneath to vertically support the tray parts from the spread flaps overlying the arm rests.

The pivoted double latch bar has a Velcro part on each end for attachment to a corresponding pad on the bottom faces of the extended tray parts. On release of the tray from the seat, the parts are easily folded for storage beside the seat or can be placed in the vehicle trunk.

For a better understanding of the invention, reference will be had to the following detailed description taken in connection with the accompanying drawing, in which, FIG. 1 is a perspective view of the detachable tray spread over a child's vehicle safety seat and embodying the features of the present invention, FIG. 2 is a top plan view of the open tray removed from the seat, FIG. 3 is a bottom plan view thereof, FIG. 4 is a bottom perspective view of the tray partly unfolded, FIG. 5 is also a bottom perspective view of the tray fully open with the parts locked against collapse and illustrating the manner of attaching the opened tray to the child's vehicle safety seat, FIG. 6 is a side elevational view of the attached tray and seat, FIG. 7 is a fragmentary bottom perspective view similar to FIG. 5 and illustrating the manner of detaching the tray from the child's vehicle seat and FIG. 8 is an elevational view of the removed tray that has been folded and being stored beside the safety seat.

DETAIL DESCRIPTION

Referring now to Figures, 15 represents a child's vehicles safety seat provided for vehicle into which a child is strapped by straps 15' for safety purposes. The child when placed therein is left without a play surface on which the child can print and color. Straps 15' are drawn over the child in the usual manner to keep the child in the seat independently of the present foldable tray 16 that embodies the features of the present invention. The child's tray 16 is spread over arm rests 15" at the sides of the seat 15 and is made secure by separable Velcro attaching parts respectively attached to the safety seat and the tray. The secured parts hold the tray in the seat sufficiently tight to prevent its removal by the child. The size and extent of the cooperating Velcro parts can run to any amount to assure security. The seat 15 is in turn supported upon a vehicle seat 17 in the back or front of the vehicle.

The child's tray 16 is made principally of tray parts 21 and 22 pivotally connected together by a fold 23 intermediate their joined extent by which they can be folded upon one another for the purpose of being stored. The principal parts 21 and 22 have elongated side flaps 26 and 27 respectively foldably connected to their outer side edges that fall down over the respective arm rests 15" of the safety seat 15 as the open tray is spread thereover in the manner illustrated in FIG. 5. These flaps 26 and 27 will extend rearwardly of the rear edges of the tray parts 1 and 2, to locate Velcro holding parts 28 and 29 of the flaps for engagement with respective cooperating pads 31 on the sides of the seat removed from reach of the child and being of sufficient area to have holding power adverse to the pull of a child. Such a Velcro part in the form of a pad 31 is shown adhered to the side of the seat 15 such as indicated in FIG. 6. A similar pad 31 will also be provided on the other side of the seat. The forward and rear edges of the tray are respectively raised at 21', 21" and 22', 22" to prevent things from sliding off the tray while leaving the side edges clear for the child's arms. The tray part 22 has a hole 24 in which a tumbler 30 may be placed as shown in FIG. 6.

Once the tray parts are opened, they need to be restrained against collapse. For this purpose there is pivotally connected a bendable latch bar 32 at 33 adjacent the fold 22 on tray part 21. This latch bar is provided with Velcro pads 32' and 32" one on each end thereof that will match with corresponding Velcro pads 34 and 35 on respective tray parts 21 and 22 as shown in FIG. 3. A rigged top tray surface is thereby provided when latch bar 32 is spread between the tray parts 21 and 22.

The Velcro connection of the parts will be so strong that the child will not have the strength to release them. The bar is bendable but stiff enough so the child cannot bend to release the Velcro connection as at both ends thereof.

The rigid tray may now be extended over the arm rests 15" of the seat with the child therein in a manner illustrated in FIG. 5 by bending forwardly depending spring straps 36 and 37 having respectively Velcro pads 36' and 37' that are extended down over the frontal faces of the arm rests 15" of the vehicle seat 15 to match respective pads 36" and 37" thereon.

As illustrated in FIG. 7 the removal of the spread tray 16 from the seat 15 is effected by lifting the spring straps 36 and 37 forwardly from their respective pads 36" and 37" on the forward faces of the seat below the respective arm rests 15" thereof. Thereafter, the double Velcro latch lever 32 is turned back onto the tray part 21.

The ends of the double latch lever 32 are bendable from the pivot connection 33 to separate their Velcro connection with their respective pads 34 and 35.

On final removal and release of the latch lever on being turned from engagement with the pads 34 and 35 and the tray parts 21 and 22 thereof can be folded together and as shown in FIG. 8 the folded tray can be easily stored beside the seat 15 or in the vehicle trunk.

While various changes may be made in the detail construction it shall be understood that such changes will be within the spirit and scope of the present invention as defined by the appended claims.

What is claimed is:

1. In a detachable foldable tray adapted for use with a child's vehicle safety seat with arm rests, a tray having at least two surface portions pivotally connected together, said tray when unfolded is adapted to extend over the arm rests of a child's vehicle safety seat, releasable means carried by the surface portions for holding the said portions extended against collapse and releasable means for securing the surface portions to the armrests of a child's vehicle safety seat that include bendable spring-like straps respectively secured to the undersurface of the respective surface portions and bendable forwardly for removable attachment to the frontal faces of the respective arm rests of a child's vehicle safety seat.

2. In a detachable foldable tray adapted for use with a child's vehicle safety seat with arm rests as defined in claim 1 and said releasable means for holding the tray parts against collapse including a double latch bar pivoted intermediate its length to one of the surface portions adjacent their pivot connection and turnable to extend across the tray parts to be latched thereto.

3. In a detachable foldable tray adapted for use with a child's vehicle safety seat as defined in claim 2 and latch bar being bendable from its pivot connection and having hook and loop cooperable fastener pads upon its ends for latch engagement with corresponding pads upon the tray pads.

4. In a detachable foldable tray adapted for use with a child's vehicle safety seat with arm rests as defined in claim 1 and said releasable means for detachably securing the tray parts to the arm rests of the safety seat including flaps respectively pivotally connected to the sides of the tray parts and hook and loop fastener pads on the flaps for attachment to cooperating side pads of the respective arm rests of a child's vehicle safety seats.

5. In a detachable foldable tray adapted for use with a child's vehicle safety seat as defined in claim 6 and hook and loop fastener means for the connection of the forwardly bendable strap with the frontal faces of the arm rests.

* * * * *